UNITED STATES PATENT OFFICE.

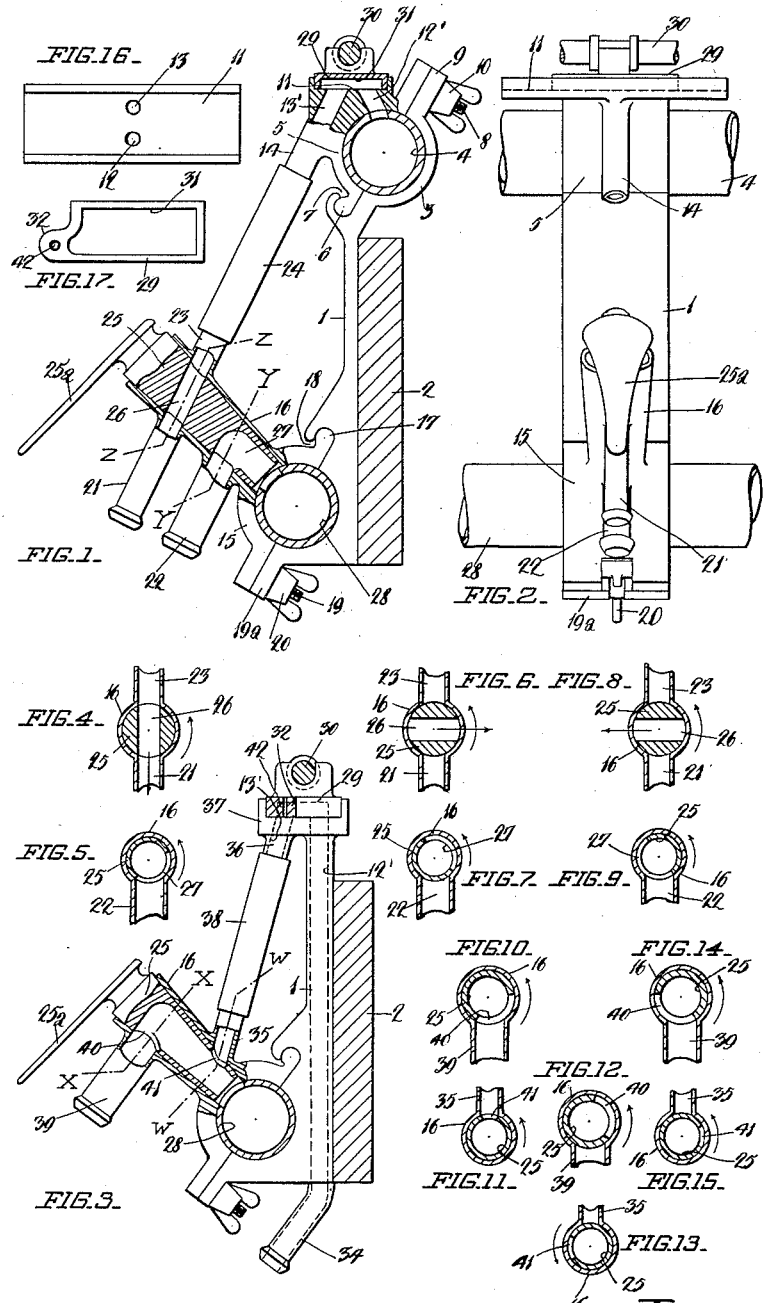

JOHN SIME READ, OF ELTHAM, TARANAKI, NEW ZEALAND.

MILKING-MACHINE INSTALLATION.

1,385,751.  Specification of Letters Patent.  Patented July 26, 1921.

Application filed August 26, 1920. Serial No. 406,182.

*To all whom it may concern:*

Be it known that I, JOHN SIME READ, a citizen of the Dominion of New Zealand, residing at Eltham, in the Provincial District of Taranaki, New Zealand, have invented certain new and useful Improvements in or Relating to Milking-Machine Installations, (for which I have filed an application in New Zealand, May 21, 1919, No. 41,712,) of which the following is a specification.

This invention relates to milking machine installations and its object is to provide a combination pipe main supporting bracket, pulsator, and tap for controlling the connections of the teat cups with the milking vacuum and pulsator.

The invention is designed for use with installations of the class in which separate pipe lines are employed for the purpose of providing the milk main and the pulsating main respectively, as well as for use with installations having a single pipe line, wherein vacuum acts for the purpose of assisting in the creation of the necessary pulsations in the outer spaces of the teat cups besides serving to draw off the milk from the inner spaces thereof.

In both instances, however, the same general features of construction are embodied. The device comprises a back plate formed with one or two pipe clamps thereon, and provided with a pulsator operating on its upper end, and a tap fitted to a pipe clamp, for the purpose of controlling the teat cup connections.

Referring to the accompanying drawing in conjunction with which the invention will be more particularly described:—

Figure 1 is a side elevation (partly in section) and

Fig. 2 a front view of the device, as constructed for use with a two pipe line installation, while Fig. 3 is a side elevation (partly in section) of the device as used in a single pipe line installation.

Figs. 4 and 5 are cross sectional views taken through Z Z and Y Y (Fig. 1) respectively showing the cock plug turned to open both the milk and the pulsation connections, to the teat cups.

Figs. 6 and 7 are similar views to Figs. 4 and 5, but showing the cock plug turned to close both the milk and the pulsation connections.

Figs. 8 and 9 are again similar views to Figs. 4 and 5 showing the plug turned to open the milk connection to the teat cups and to close the pulsation connection.

Figs. 10 and 11 are cross sectional views taken through the lines X X and W W respectively (Fig. 3) showing the cock plug turned to open both the milk and the pulsation connections.

Figs. 12 and 13 are similar views to Figs. 10 and 11 but showing the plug turned to close both the milk and the pulsation connections.

Fig. 14 and 15 are again similar views to Figs. 10 and 11 but showing the cock plug turned so that the milk connection to the teat cups is opened and the pulsation connection closed.

Fig. 16 is a plan view of the face on which the pulsator slide works, and

Fig. 17 is an inverted plan view of the pulsator slide valve.

Referring to Figs. 1, 2 and 4 to 9 of the drawings 1 is the bracket adapted to be secured to a fixture 2 and provided at its upper end with a pipe clamp 3 to receive the vacuum pipe 4.

The portion 5 of the clamp 3 is detachable from the bracket, it being secured thereon by inserting the projection 6 in the recess 7 in said bracket, and turning the pivoted stud 8 into the forked lug 9 and screwing a wing nut 10 on said stud.

The portion 5 of the clamp is formed with a valve surface 11 through which ports 12 and 13 open the port 12' communicating with the vacuum pipe 4 and the port 13' with the nipple 14 projecting downward from said portion 5.

The lower clamp for supporting the milk pipe 28 has a detachable portion 15 integral with which a tap casing 16 is formed, said portion 15 being secured to the bracket 1 by having a projection 17 to enter a recess 18 in the bracket 1 and a pivoted stud 19 adapted to enter a forked lug 19ᵃ on the bracket 1 and take a wing nut 20.

The tap casing 16 is formed with nipples 21, 22 projecting from one side and a nipple 23 projecting from the other side, the latter nipple being connected with the nipple 14 by tubing 24.

The plug 25 which works in the casing 16, contains an upper cross passage 26 and a lower port 27, the latter opening through the side of the plug in the same plane as the passage 26, and also through the bottom of the plug so as to be in constant communication with the milk pipe 28.

The slide valve 29 reciprocated by the rod 30 on the surface 11 has a recess 31 in its lower side, for the purpose of bridging the ports 12, 13, and also has an extension 32 at one end, whereby it is capable of opening the port 13′ to atmosphere while keeping the port 12′ closed.

The nipple 21 is adapted to be put in communication with the outer or inflator spaces of teat cups, and the nipple 22 with the inner or milk spaces of same.

The handle 25ᵃ of the plug 25 is preferably located in the same plane as the ports in the plug, in order to serve as a guide in bringing them to the required positions.

To enable the usual milking operations to be performed by the machine, the plug 25 is turned so that the passage 26 connects the nipple 23 with the nipple 21, at the same time as the port 27 puts the nipple 22 in communication with the milk pipe 28.

The slide valve 29 by its reciprocation on the surface 11 connects the port 13 with the port 12′ and allows vacuum from the pipe 4 to act in the outer spaces of the teat cups, alternately with opening said port 13′ to atmosphere and permitting air to pass into the outer spaces of the teat cups, which together with the steady vacuum acting in the milk spaces of the cups, produces the necessary pulsations and the milk flows into the pipe 28.

By giving the plug 25 a quarter turn in the direction indicated in Figs. 6 and 7, so that the handle 25ᵃ will occupy the position shown by the straight arrow (Fig. 6) the nipple 21 can be cut off from the pulsator simultaneously with the cutting off of the nipple 22 from the pipe 28.

If the plug 25 is given an additional half turn in the same direction as shown in Figs. 8 and 9, so that the handle 25ᵃ comes to the position indicated by the straight arrow, it will be found that the nipple 21 is still cut off from the pulsator, while the nipple 22, owing to the side opening of the port 27 being elongated, will be put in communication with the milk pipe 28. The latter position of the plug 25 enables water to be drawn or flushed through the parts of the installation through which milk passes and which require to be kept thoroughly clean.

Referring to the construction illustrated in Figs. 3 and 10 to 15 for use with installation in which only one pipe, the milk pipe 28, is used, the port 12′ passes downward through the bracket 1 and has a nipple 34 fitted in its lower end, said nipple being adapted to be put in communication with the outer or inflator spaces of the teat cups.

The tap casing 16 has in this case a lower nipple 35 projecting from one side, said nipple 35 being connected by tubing 38 with a nipple 36 projecting downward from the block 37 on which the slide valve 29 operates, the latter nipple being in communication with the port 13′. From the other side of the casing 16 an upper nipple 39 projects, this last mentioned nipple being adapted to be put in communication with the milk spaces of the teat cups.

The plug 25 is in this case hollow, its lower end being constantly open to the milk pipe 28. An upper elongated port 40 in the plug is adapted to register with the nipple 39 at the same time as the lower port 41 registers with the nipple 35.

With the plug 25 turned to the position shown in Figs. 3, 10 and 11, the usual milking operations can be carried out, only in this construction it is the port 12′ that is alternately connected with vacuum and opened to atmosphere, the extension 32 on the valve 29 being formed to enable this to be done. The same vacuum from the pipe 28 acts in all of the nipples 39, 35 and 36.

In order to prevent the possibility of milk being drawn up to the pulsator by way of the nipple 35 tubing 38 and pulsator nipple 36, a small hole 42 is provided in the extension 32 of the slide valve 29, so that air is admitted to the nipples 35, 36 and tubing 38, at the same time as the port 12 is opened to atmosphere by the valve 29.

By giving the plug 25 a quarter turn as before, both of the nipples 39 and 35 can be cut off from the pipe 28 (Figs. 12, 13) and an additional half turn enables the nipple 39 to be maintained in communication with the pipe 28 while the nipple 35 is cut off from same.

What I claim and desire to secure by Letters Patent of the United States is:—

1. In milking machine installations, a combination pipe line supporting bracket, pulsator, and milk and pulsator connection controlling tap.

2. In milking machine installations, a vertical back plate provided with pipe line clamping means and having a pulsator appliance constructed to work on its upper end; and a tap mounted upon said clamping means to control milk and pulsator connections of the teat cups.

3. In milking machine installations, a vertical back plate provided with pipe line clamping means and having a pulsator appliance working on its upper end; a tap casing on said clamping means in communication with the milk pipe; a pulsator connection communicating with said casing, adapted to be put in communication with the outer spaces of teat cups; a milk connection adapted to be put in communication with the inner spaces of teat cups; and a plug constructed and working in said casing to control said connections.

4. In milking machine installations, a vertical back plate having a pulsator appliance working on its upper end; pipe line supporting means on said plate, a clamp fitting said supporting means; a tap casing on said clamp in communication with the milk pipe; a connection between said casing and the pulsator; a pulsator connection communicating with said casing and adapted to be put in communication with the outer spaces of teat cups; a milk connection from said tap casing adapted to be put in communication with the inner spaces of teat cups; and a plug operating in said casing to control said connections.

5. In milking machine installations, a vertical back plate having a pulsator appliance working on its upper end; pipe line supporting means on said plate; a clamp fitting said supporting means; a tap casing on said clamp, in communication with the milk pipe; a connection between said pulsator and casing; a pulsator connection communicating with said casing and adapted to be kept in communication with the outer spaces of teat cups; a milk connection from said casing to be put in communication with the inner spaces of teat cups; and a plug containing an elongated port adapted to open the teat cup milk connection, and a port adapted to open the teat cups pulsator connection.

In testimony whereof I affix my signature in the presence of two witnesses.

JOHN SIME READ.

Witnesses:
WILLIAM PERICHER,
WILLIAM FRANK WILLIAMS.